United States Patent
Gebbeken et al.

(10) Patent No.: US 10,051,771 B2
(45) Date of Patent: Aug. 21, 2018

(54) DOUBLE DISC COULTER

(71) Applicant: LEMKEN GmbH & Co. KG, Alpen (DE)

(72) Inventors: Martin Gebbeken, Alpen (DE); Dieter Werries, Alpen (DE); Christian Paessens, Issum (DE); Thomas Lukas, Ahaus Wülfen (DE); Mark Berendsen, AJ Lengel (NL); Christian Gotzen, Viersen (DE); Marcel Geraats, Nettetal (DE); Dennis Bergerfurth, Rees (DE)

(73) Assignee: LEMKEN GmbH & Co. KG, Alpen (DE)

(*) Notice: Subject to any disclaimer, the term of this patent is extended or adjusted under 35 U.S.C. 154(b) by 0 days.

(21) Appl. No.: 14/787,016

(22) PCT Filed: Apr. 14, 2014

(86) PCT No.: PCT/DE2014/000190
§ 371 (c)(1),
(2) Date: Mar. 2, 2016

(87) PCT Pub. No.: WO2014/173385
PCT Pub. Date: Oct. 30, 2014

(65) Prior Publication Data
US 2016/0192572 A1    Jul. 7, 2016

(30) Foreign Application Priority Data
Apr. 26, 2013  (DE) .................. 10 2013 007 234

(51) Int. Cl.
*A01B 15/18*  (2006.01)
*A01C 5/06*   (2006.01)

(52) U.S. Cl.
CPC .............. *A01B 15/18* (2013.01); *A01C 5/064* (2013.01)

(58) Field of Classification Search
CPC ................................. A01C 5/064; A01B 15/18
USPC .................. 172/575, 604, 560; 111/163–166
See application file for complete search history.

(56) References Cited

U.S. PATENT DOCUMENTS

| | | | | |
|---|---|---|---|---|
| 736,963 A | * | 8/1903 | Ham ...................... | A01C 5/06 111/165 |
| 1,046,231 A | * | 12/1912 | Stainfield et al. ..... | A01B 13/00 172/575 |
| 1,077,338 A | * | 11/1913 | Elliott et al. .......... | A01B 13/00 172/575 |

(Continued)

FOREIGN PATENT DOCUMENTS

DE      1295260 B      5/1969
DE  102010037240 A1   3/2012
(Continued)

*Primary Examiner* — Matthew D. Troutman
(74) *Attorney, Agent, or Firm* — James Creighton Wray; Meera P. Narasimhan (57) ABSTRACT

A double disc coulter 1 has two disc coulters 2 angled to each other to form a V shape that are rotatable on hollow axle stubs 3 by means of bearing units 18. One hollow axle stub 3 is arranged with a flange face 5 facing the coulter bar 4 at an angle to the vertical plane of the rotation axis of the hollow axle stubs. At the same time, the hollow axle stub 3 determines the angular position of the plane 13 that intersects in the rotation axis 6 and in an axis 7 vertical to the flange face 8, 9 of the coulter bar 4.

11 Claims, 7 Drawing Sheets

(56) References Cited

U.S. PATENT DOCUMENTS

| | | | | |
|---|---|---|---|---|
| 1,079,140 A * | 11/1913 | Packham | ............... | A01B 13/00 |
| | | | | 172/575 |
| 1,095,798 A * | 5/1914 | Brennan, Jr. | .......... | A01B 13/00 |
| | | | | 172/575 |
| 1,124,006 A * | 1/1915 | Gallespie | ............... | A01B 15/16 |
| | | | | 172/560 |
| 1,165,735 A * | 12/1915 | Wentz | .................... | A01B 39/04 |
| | | | | 172/254 |
| 1,170,740 A * | 2/1916 | Dickinson | ............. | A01B 13/00 |
| | | | | 172/575 |
| 1,860,305 A * | 5/1932 | Baseman | ................ | F16C 33/74 |
| | | | | 111/164 |
| 2,924,189 A * | 2/1960 | McLeod | ................ | A01C 5/062 |
| | | | | 111/150 |
| 4,345,531 A * | 8/1982 | Redl | ...................... | A01B 77/00 |
| | | | | 111/158 |
| 4,590,869 A * | 5/1986 | Steilen | ................... | A01C 5/064 |
| | | | | 111/164 |
| 4,732,398 A * | 3/1988 | Biss | ....................... | A01B 71/08 |
| | | | | 111/164 |
| 4,765,262 A * | 8/1988 | Morgan | ................. | A01C 5/064 |
| | | | | 111/164 |
| 5,673,757 A * | 10/1997 | McDonald | ............. | A01B 15/16 |
| | | | | 111/158 |
| 6,082,276 A | 7/2000 | Klein | | |
| 9,107,340 B2 * | 8/2015 | Stark | ...................... | A01C 5/064 |
| 2007/0074879 A1 * | 4/2007 | Frasier | .................. | A01B 71/04 |
| | | | | 172/604 |

FOREIGN PATENT DOCUMENTS

| | | |
|---|---|---|
| FR | 1212364 A | 3/1960 |
| WO | 8505246 A1 | 12/1985 |

* cited by examiner

DOUBLE DISC COULTER

This application claims the benefit of German Application No. 10 2013 007 234.4 filed Apr. 26, 2013, and PCT/DE2014/000190 filed Apr. 14, 2014, International Publication No. WO 2014/173385, which are hereby incorporated by reference in their entirety as if fully set forth herein.

The invention concerns a double disc coulter.

BACKGROUND OF THE INVENTION

Double disc coulters are used in particular to introduce agricultural products such as seed or fertilisers into the ground and are characterised by their low susceptibility to blockages. Through the angled position of the disc coulters to one another, a V-shaped furrow is formed in the ground into which the agricultural products are placed in liquid or solid form. A double disc coulter of this type is disclosed for example in EP 1 911 340. What double disc coulters that have become familiar up to now have in common is that the disc coulter position is defined by the shape of the coulter holder. This is achieved through slanted welding on of axle stubs or die-cut shaping such as forming from solid or dead-mould casting. Naturally, this is also possible through material removing mechanical machining. However, these methods are all either inaccurate with regard to shaping or complicated and are expensive for series production. DE 10 2010 037 240 A1 shows a coulter holder of this type, in which a complicated bent axle beam, which is difficult to manufacture with an extremely complicated geometry, is pushed through the coulter bar, whereby the coulter bar in turn has mechanically machined flange faces for defining the disc coulter position in several settings.

The task of the invention is therefore to make a low-cost fastening for the disc coulters that can also be mounted easily and correctly.

SUMMARY OF INVENTION

According to the invention, the task is solved through the characteristics of claim 1, whereby in the further patent claims advantageous supplementary and alternative solutions are claimed.

The hollow axle stub fits closely to the coulter bar with a flange or collar with an angled or slanted flange face and thus specifies the slanted position of the hollow axle stubs to one another or to the coulter bar. As a component that is comparatively simple to manufacture and fit, the hollow axle hereby fulfils an advantageous multiple function in that in addition it defines the angular position of the plane that intersects in the rotation axis and an axis vertical to the flange face of the coulter bar. The hollow axle stub has a flange face facing the coulter bar that is arranged to a plane vertical to its rotation axis. In addition, the hollow axle stub defines the angular position of a plane that intersects an axis through the rotation axis and an axis vertical to the flange face of the coulter bar.

It is advantageous that the angular position of the planes is set by positivef it elements, which are allocated to the hollow axle stubs and/or the coulter bar, insofar as the hollow axle stub serves at the same as torsion protection, so that a corresponding part can be saved. Instead, the positive-fit elements set the angle position or the torsion of the hollow axles on the side seen on the coulter bar. An imaginary plane, which intersects in the rotation axes of the axle supports and of an axis vertical on a flange face of the coulter bar and stands vertically on the slanted flange face of the respective hollow axle stub, intersects the distance point of the lowest distance between the disc coulters. This point lies preferably below the coulter bar and, laterally measured, horizontally between the suspension of the coulter bar and the hollow axle stubs or directly beneath the hollow axle stubs. The position of this and the position of the positive-fit elements are dependent on each other. In this way, the double disc coulter and the alignment of its disc coulters in their position to the coulter bar can be fitted correctly and easily defined.

It is envisaged that the positive-fit elements are designed as a cross-section deviating from the circular form, preferably as a stud section or opening section. During assembly, the axle stub is inserted in the coulter bar from its inside and then fixed in place by means of a fastener and from the outside by the bearing unit. For this purpose, the coulter bar and the flange face are designed to correspond with one another, e.g. with a holder on the side of the coulter bar and a flange face in the form of a polygon. With the stud section, the axle stubs are inserted in the holder on the coulter bar side and held there rigidly. The described flange face, with which the axle stub is in contact with the coulter bar, is located between the stud section and the hollow cylinder. Torsion protection can be made easily by choosing, for example, a square or hexagonal hole or a bevelled hole or keyhole in the coulter bar and a matching counter form on the flange side of the hollow axle stub, whereby the protection can be a component of the cutting in the coulter bar. Star-shaped or denticulated cross-sections are conceivable as well. In this way, the alignment of the disc coulters can be set in several positions in its rotation towards the vertical axis of the flange face. Assembly errors are eliminated through the design of this axle stub. Different or deviating alignments of the hollow axle stubs to one another are representable as well.

In an advantageous version of the invention it is provided that the opposing flange faces of the coulter bar are made of flat material and are aligned at least approximately parallel to each other. This means that the coulter bars can be made at low cost, for example from a blank sheet with a continuously even material thickness in a single or setting or position without further processing in the flange area.

In accordance with a further version of the invention it is provided that hollow axle stubs are inserted in the coulter bar on both sides and fastened jointly by means of a continuous fastener. In this way, by means of a single assembly process both disc coulters can be fastened to the coulter bar with a threaded bolt or screws and nuts, without subsequent welding being necessary. Riveting or other methods that generate clamping tension are conceivable as well.

It is conceivable in principle that the flange face is integrated in the hollow axle stub or designed as a separate component that is located by means of positive-fit elements resistant to torsion between the hollow axle stub and a flange face of the coulter bar. In the former variant, the axle stub and the flange face form a joint component, with the latter variant, by choosing differently angled intermediate pieces, for example, various angle positions of the disc coulters to one another can be achieved in a simple manner. In particular, by choosing different diameters of disc coulter pairs the angle position of the disc coulters to each other is so adaptable that there is always a minimum clearance of the discs at the narrowest position. This clearance can be also be set to 0 or to a theoretically negative value, which causes a slight pretensioning of the disc coulters at the point of contact to one another. The hollow axle stub is designed advantageously as a component of the bearing unit and can serve in an additional function as running surface or inside ring and in this way take over more functions and replace corresponding separate parts.

In a special embodiment, the disc coulters are offset laterally from one another, in that the hollow axle stubs, in relation to a plane parallel to the flange face of the coulter bar, are positioned at a distance from one another. In difficult situations, an improved cutting effect of the double disc coulters through plant residues in the ground can be achieved through this preferably horizontally displaced arrangement.

The assembly of this embodiment is achieved simply and at low cost because the hollow axle stubs have an internal thread and are clamped with a screw or a stud bolt with a nut against the coulter from the inside, that is, from the other side of the flange face of the coulter bar. This means that coulters with a clearance from each other seen from the side can be fastened quickly and reliably on a coulter bar. The disc clearance can even be kept very small by using in particular hexagon socket or screws with an internal torx shape. In particular, screws with combined or applied protection against unintended loosening lend themselves here.

In addition, it is recommended that the hollow axle stubs are manufactured using a primary shaping or forming process. The hollow axle stub can be manufactured in its mould without removal of material. Casting, die casting, injection moulding, forging, pressing or sintering, for example, are suitable for this purpose as shaping processes.

In a particularly advantageous embodiment of the invention it is provided that the hollow axle stubs are made of plastic, which can be fibreglass reinforced where necessary. Plastic parts manufactured with plastic injection moulding reduce production costs considerably in comparison with machining processes.

Clamping the hollow axle stubs against the coulter bar could lead to bending stresses in fasteners designed as bolts. In order to be better able to support the latter, it is provided that at least one supporting element is located between the two hollow axle stubs and/or between the hollow axle stubs and the fastener. For this purpose, a supporting element is inserted in the opening of the of the coulter bar between the hollow axle stubs or between hollow axle stub and fastener or allocated to the coulter bar, in order to counter the bending forces by bracing. Otherwise there would be a danger that the fastener worked its way into the inner bore of the hollow axle stub, particularly if the latter is made of plastic. In any case, it is important with this embodiment to prevent the plastic coming into contact with the bolt as far as possible. The supporting element can be a washer or a part adapted to the bolt diameter or a part whose external contour deviates from the circular shape. Something like a sheet blank is imagined here.

In a further embodiment of the invention it is provided that at least one disc coulter is made at least in part from elastically deformable material. Through the at least sectional elastic design e.g. PUR or rubber, the disc coulters can be fitted deformable against each other. In this way, a self-cleaning effect is achieved, in particular in sticky soil conditions.

According to an additional proposal, it is expedient if the two disc coulters are designed to have different outer diameters. The cutting effect of the larger disc coulters is improved through the selection of different disc diameters, in particular with large amounts of harvest resides on the ground. Blockages and so-called "hair pinning", in which plant residues are pressed vertically into the seed furrow by the disc coulters, are prevented.

The invention is characterised in particular in that a double disc coulter is created with two coulters angled towards each other in a V-shape, which enables easy and low-cost assembly. In several respects, the design of the hollow axle stub as a part that is comparatively easy to manufacture, on which the coulters pivot by means of bearing units, proves to be advantageous. Positive elements are assigned to the hollow axle stubs and the coulter bars that predetermine the angular position or the twisting of a plane that intersects in the rotation axis and an axis vertical to the flange face of the coulter bar. In doing this, this plane intersects a distance point that lies underneath the coulter bar. Flange faces are preferably integrated in the hollow axle stub, i.e. manufactured with this as a single piece. In addition, thanks to the angled flange face, the hollow axle stubs define the slanted position to the coulter bar at their inner side facing the coulter bar; low-cost standard components can be made use of with the other parts around the fastening and bearings. At the same time, the hollow axle stubs serve as torsion protection with the polygonal attachments on their inner sides. The coulter bars, for example, can be cut from a metal plate without further machining interlocked next to each other. Laser or waterjet cutting processes are very precise and still reasonable, but stamping or flame-cutting is conceivable as well.

Further details and advantages of the object of the invention can be found in the following description and the associated drawings, in which a design example is shown with the details and individual parts required for it.

DETAILED DESCRIPTION OF THE INVENTION

Figure 1:
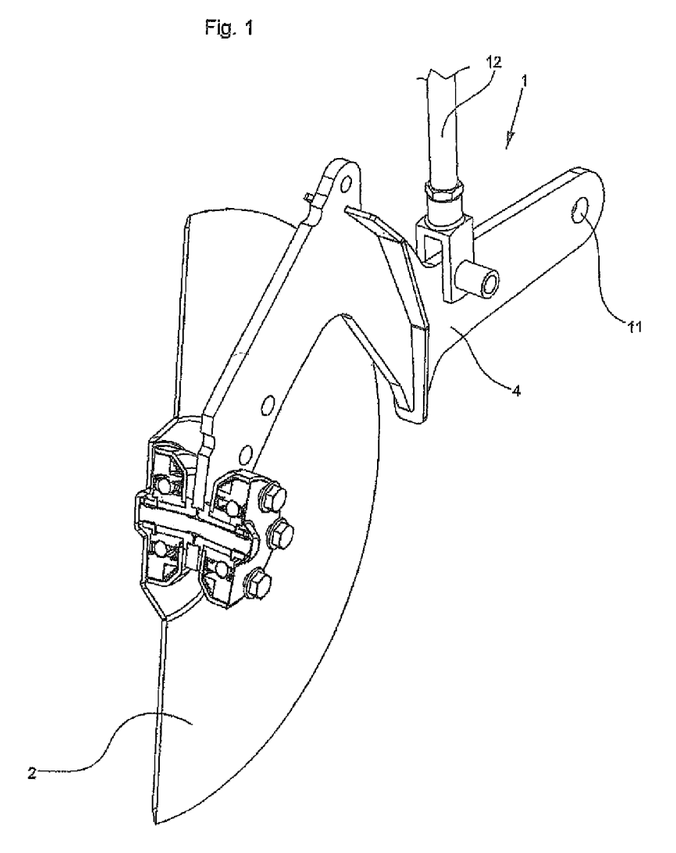
FIG. 1 Shows the cross-section through a double disc coulter in a perspective presentation, FIG. 2 Shows a sectional view through the two axes of a double disc coulters and the coulter bar, FIG. 3 Shows the side view of half of a double disc coulter, FIG. 4 Shows a perspective view of a hollow axle stub, FIG. 5 Shows a variant of FIG. 4, FIG. 6 Shows a variant of FIG. 2 and FIG. 7 Shows a varied sectional view of FIG. 1.

FIG. 1 shows the sectional view through a double disc coulter in a perspective presentation. For a better view of the coulter holder the right coulter disc is not shown. The double disc coulter 1 is laterally spaced from other double disc coulters that are not shown and connected to a cross-member with the front drill hole 11 vertically movable by means of bearing elements, which itself is connected to the main frame of a spreading machine. A vertical strut 12, connected movable to the coulter bar, can exercise a compression force on the coulter bar 4 and the double disc coulter 1 with a spring or other effective force with regard to a thrust bearing, so that the former penetrate the soil. The soil is pushed apart in a V shape through the V-position of the disc coulters with regard to one another. The agricultural product can be placed in this V-furrow with application pipes, which are not shown further and which project into the intermediate space between the disc coulters 2, and the V-furrow can be closed again with a depth wheel or a furrow closer. In addition, a depth wheel or another limiting device can limit the depth that the double disc coulter penetrates into the ground.

Figure 2:
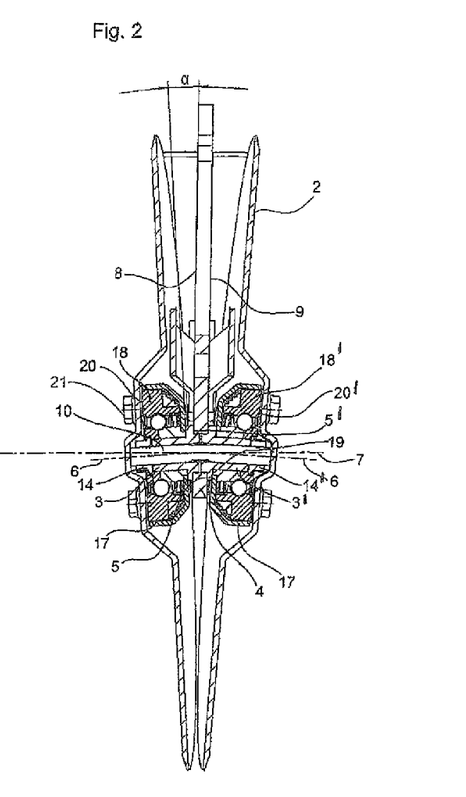

The sectional view in accordance with FIG. 2 shows clearly the two hollow axle stubs 3, 3' with their bevelled flange faces 5, 5', which are clamped through the bolt 10 with nuts 14, 14' against the parallel surfaces 8, 9 of the coulter bar 4. The V position of the coulter discs to each other arises from the oblique angle α of the hollow axle stubs 3. Positive elements 15 in the coulter bar 4 designed as hexagonal opening 23 secure the hexagonal attachments of the hollow axle stub 3 against torsion with regard to the coulter bar 4 and predetermine the position of the plane 13. The bearing units 18, 18' that are fitted with a protective cover 17 and gaskets are slid or pressed onto the hollow axle stubs 3, 3', and are also braced through nuts 14, 14' against the sealing face 19 of the respective hollow axle stub 3 that is opposite the slanted flange face 5, 5'. There are threaded holes in the bearing unit 18, 18' in the outer flange face 20, 20'. The respective disc coulters 2 are fastened against these flange faces 20, 20' with screws 21 in the threaded holes of the bearing units 18, 18'. The flange face 20, 20' can also project beyond the protective cover 17. The screws 21 can then be secured through the flange with nuts on the opposite side.

Figure 3:
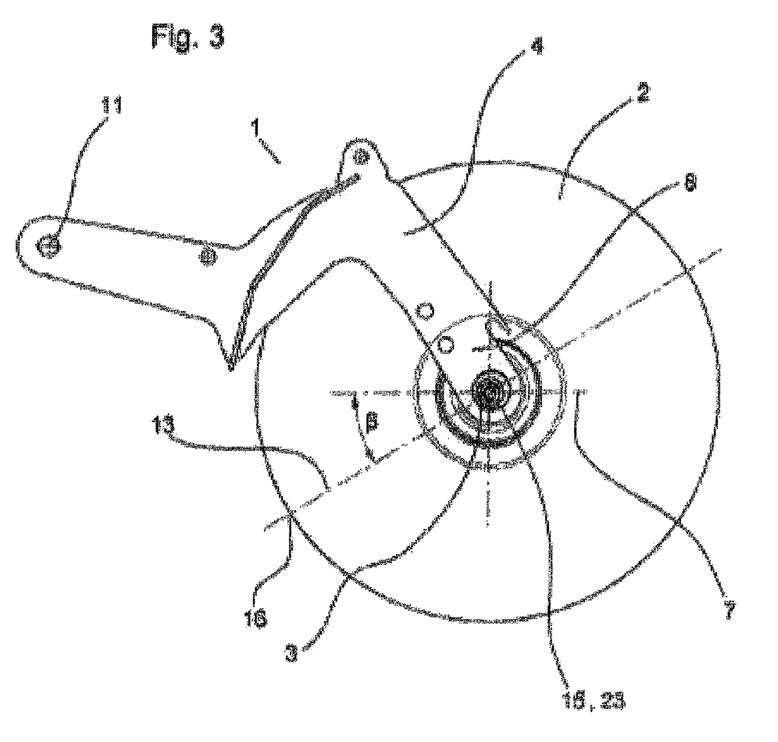

The side view in FIG. 3 shows a partly dismantled representation of the double disc coulter 1. The axis 7 is vertical on the flange face 5 of the coulter bar 4. The distance point 16 with the shortest distance of the coulter discs between one another is thus also determined relative to the coulter bar 4 and lies on or in the vicinity of plane 13 in the edge are of the disc coulters 2. Angle β shows the position of plane 13 and the smallest distance point 16 of the coulter disc 2 in its position to the coulter bar looking in the direction of the axis 7. Angle β is given through the position of the positive-fit elements 15, here the hexagonal opening 23.

Figure 4:
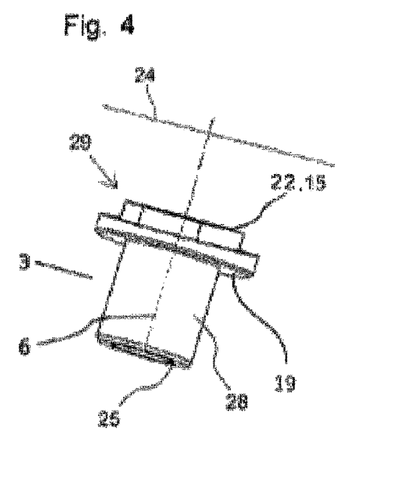

The perspective in FIG. 4 shows the view of the sealing face 19 of the hollow axle stub 3 with its rotation axis 6. The bearing unit 18 is slid from the outer side 25 onto the hollow cylinder 28 until the bearing unit 18 has reached its defined seat on the sealing face 19. The hollow axle stubs 3 are connected to one another with their inner sides 29 facing each other against the coulter bar with a means of fastening that is not shown here. The plane running vertically to the axis 6 and to the sheet level is marked 24. The plane 24 also runs parallel to the flat surface of the outer side 24 of the hollow axle stub 3.

Figure 5:
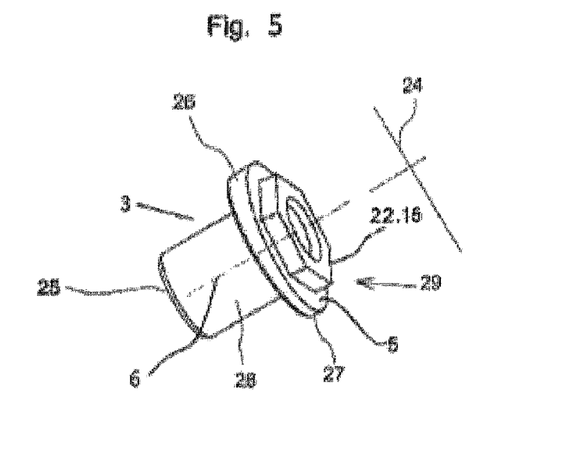

In supplement, FIG. 5 shows the view of the hollow axle stub 3 with its rotation axis 6. The journal 22 shown here in a hexagonal shape secures the hollow axle stub 3 against torsion. Flange face 5, arranged slanted to the vertical plane of the rotation axis 6 can also be seen, which increases constantly in its depth between the two opposite ends 26 and 27 and thus predetermines the angled positioning.

Figure 6:
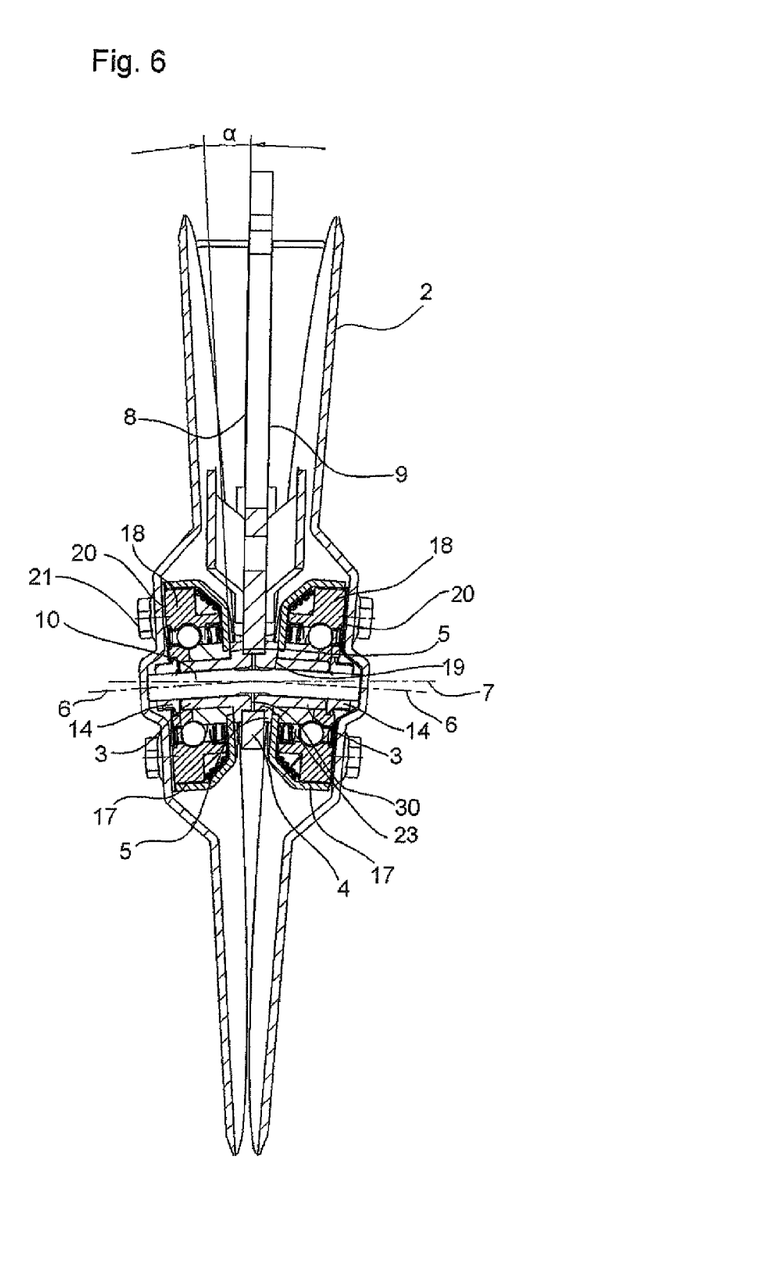

FIG. 6 shows the same perspective sectional view as FIG. 2. However, in FIG. 7 an additional supporting element 30 is inserted as a form element that has an internal diameter that matches bolt 10 and is shaped in its external contour corresponding to the opening contour 23 of the coulter bar 4. If the hollow axle stubs 3, 3' are arranged offset to each other in the coulter bar plane, it may be practical to fit the respective supporting element 30 with an external flange, which forms a contact surface to the coulter bar 4 on the side of the coulter bar 4 opposite the hollow axle stubs 3, 3'. The interior bore of the hollow axle stubs 3, 3' is arranged here preferably asymmetrically, in order to be flush with axis 6 with bolt 10. For this purpose, the supporting element 30 can even be equipped with an internal thread, in order to clamp the bolt 10, which is designed as a screw, against the coulter bar 4 from the sides of the hollow axle stubs 3, 3'.

Figure 7:
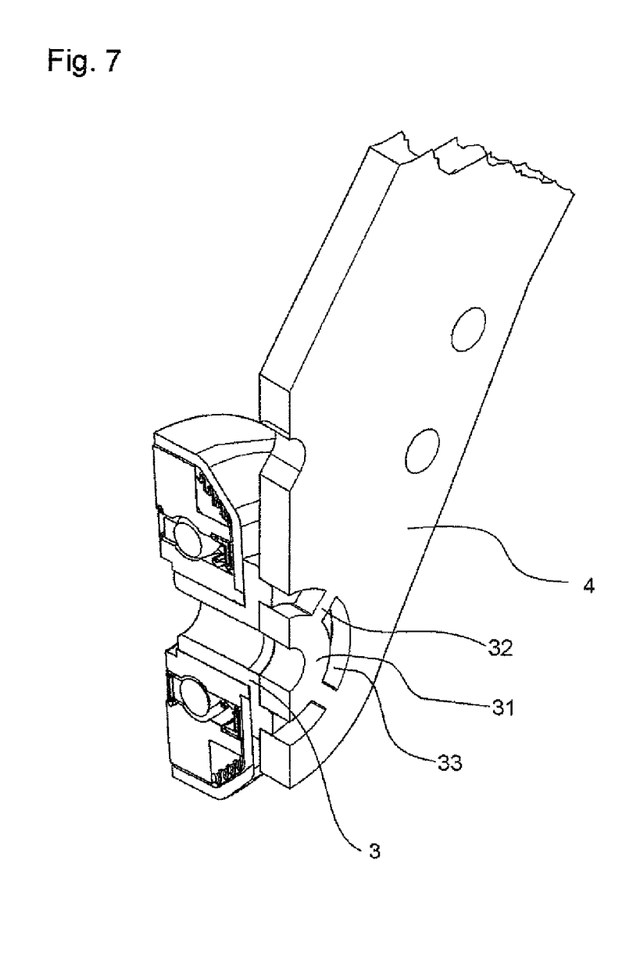

Finally, FIG. 7 shows a further exposed perspective cross-section, as already described in FIG. 1. For the sake of clarity, the shading was omitted. It can be seen how the hollow axle stub 3 engages correspondingly in the partial openings 33 of the coulter bar 4. The supporting element 31 and the bars 32 that bear this supporting element 31 are cut out of the coulter bar material by means of simple laser cutting. In the same way, a single bar 32 with a shape corresponding to the hollow axle stub 3, 3' is sufficient to stabilise the bolt 10 that is not shown here.

Figure 8:
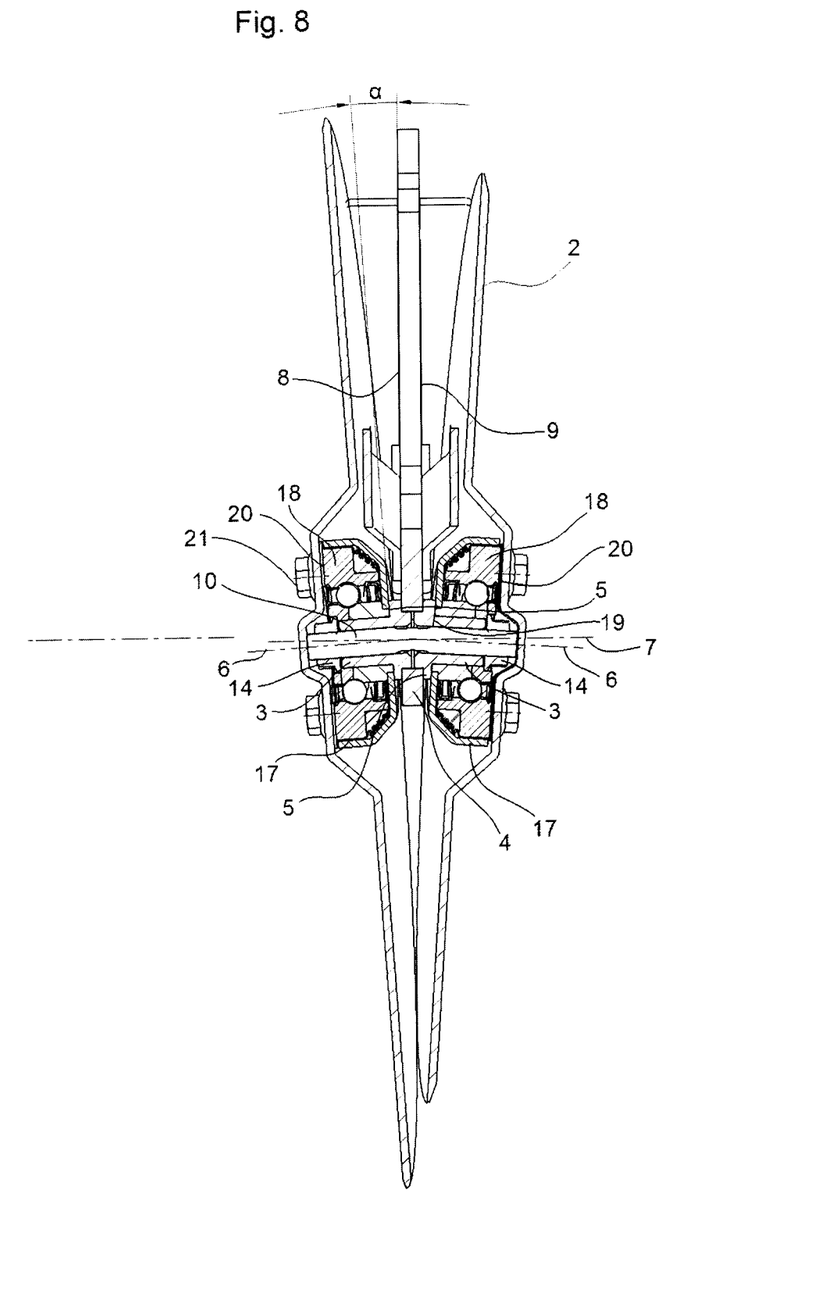
FIG. 8 shows another variant of FIG. 2.

According to FIG. 8, the two disc coulters 2 are designed to have different outer diameters. The cutting effect of the larger disc coulters is improved through the selection of different disc diameters, in particular with large amounts of harvest resides on the ground. Blockages and so-called "hair pinning", in which plant residues are pressed vertically into the seed furrow by the disc coulters, are prevented.

The invention claimed is:

1. A double disc coulter (1) comprising two disc coulters (2) and angled hollow axle stubs (3), the two disc coulters (2) disposed on the angled hollow axle stubs being angled towards each other to form a V shape, the two disc coulters being rotatable on the hollow axle stubs (3) by means of bearing units (18) and are fixed pretensioned with the hollow axle stubs (3) and respective flange faces (5) against flange faces (8, 9) of a coulter bar (4), wherein each hollow axle stub (3) has one flange face (5) facing the coulter bar (4) that is arranged at an angle to a vertical plane (24) through a rotation axis (6) of the hollow axle stubs (3) and that the hollow axle stub (3) determines the angular position of a plane (13) that intersects in the rotation axis (6) and an axis (7) vertical to the flange face (8, 9) of the coulter bar (4) such that respective peripheries of the two disc coulters (2) do not intersect inner planes of each of the two disc coulters (2), wherein an angular position of the plane (13) is determined through the flange face (5) of the hollow axle stubs (3) and a holder on the coulter bar, and wherein the hollow axle stub and the holder on the coulter bar have complimentary shapes to one another in the form of a polygon or hole arranged centrally in the hollow axle stub (3).

2. The double disc coulter in accordance with claim 1, wherein the flange faces (8, 9) are opposing flange faces (8, 9) of the coulter bar (4) made of flat material and are arranged at least approximately parallel to each other.

3. The double disc coulter in accordance with claim 1, wherein the hollow axle stubs (3) are inserted on both sides into the coulter bar (4) and are fixed jointly by means of a continuous fastener (10).

4. The double disc coulter in accordance with claim 1, wherein the one flange face (5) of the hollow axle stubs is integrated in the hollow axle stub (3) or designed as a separate part that is arranged by means of positive-fit elements (15) so that it cannot rotate between the hollow axle stub (3) and the coulter bar (4).

5. The double disc coulter in accordance with claim 1, wherein the hollow axle stubs (3), in relation to a plane parallel to the flange faces (8, 9) of the coulter bar (4), are positioned at a distance from each other.

6. The double disc coulter in accordance with claim 1, wherein the hollow axle stubs (3) are designed to be clampable against the coulter bar (4) from an inner side (29) with a screw or a space bolt with nut.

7. The double disc coulter in accordance with claim 1, wherein the hollow axle stubs (3) are manufactured using a shaping or forming process.

8. The double disc coulter in accordance with claim 1, wherein the hollow axle stubs (3) are made of plastic.

9. The double disc coulter in accordance with claim 1, wherein a supporting element (30, 31) is arranged between the two hollow axle stubs (3, 3') and/or between the hollow axle stubs (3, 3') and a fastener (10).

10. The double disc coulter in accordance with claim 1, wherein at least one of the two disc coulters (2) is made at least in part from an elastically deformable material.

11. The double disc coulter in accordance with claim 1, wherein the two disc coulters (2) are designed to have different outside diameters.

\* \* \* \* \*

UNITED STATES PATENT AND TRADEMARK OFFICE
CERTIFICATE OF CORRECTION

PATENT NO. : 10,051,771 B2
APPLICATION NO. : 14/787016
DATED : August 21, 2018
INVENTOR(S) : Martin Gebbeken et al.

Page 1 of 1

It is certified that error appears in the above-identified patent and that said Letters Patent is hereby corrected as shown below:

On the Title Page

In Item (72) the city of the inventor, Thomas Lukas, should read:
Ahaus-Wüllen

Signed and Sealed this
Second Day of July, 2019

Andrei Iancu
*Director of the United States Patent and Trademark Office*